(12) United States Patent
Goralnick

(10) Patent No.: US 9,646,326 B2
(45) Date of Patent: May 9, 2017

(54) ADVERTISING-INTEGRATED CAR

(71) Applicant: Gary Goralnick, Woodland Hills, CA (US)

(72) Inventor: Gary Goralnick, Woodland Hills, CA (US)

(*) Notice: Subject to any disclaimer, the term of this patent is extended or adjusted under 35 U.S.C. 154(b) by 0 days.

(21) Appl. No.: 14/208,167

(22) Filed: Mar. 13, 2014

(65) Prior Publication Data

US 2015/0262239 A1 Sep. 17, 2015

(51) Int. Cl.
*G01C 21/36* (2006.01)
*G06Q 30/02* (2012.01)

(52) U.S. Cl.
CPC ......... *G06Q 30/0266* (2013.01); *G01C 21/36* (2013.01); *G01C 21/3697* (2013.01)

(58) Field of Classification Search
USPC .......................................................... 701/23
See application file for complete search history.

(56) References Cited

U.S. PATENT DOCUMENTS

| | | | | |
|---|---|---|---|---|
| 5,973,619 A * | 10/1999 | Paredes | ........... | G06Q 10/02 235/384 |
| 6,317,718 B1 * | 11/2001 | Fano | ........... | G06F 17/3087 705/14.39 |
| 6,711,548 B1 * | 3/2004 | Rosenblatt | ........... | G06Q 10/02 705/5 |
| 7,903,029 B2 * | 3/2011 | Dupray | ........... | G01S 5/0257 342/442 |
| 8,630,897 B1 * | 1/2014 | Prada Gomez | ........... | G06Q 30/02 705/14.11 |
| 9,020,697 B2 * | 4/2015 | Ricci | ........... | H04W 48/04 701/36 |
| 9,481,366 B1 * | 11/2016 | Gordon | ........... | B60W 30/09 |
| 9,481,367 B1 * | 11/2016 | Gordon | ........... | B60W 30/09 |
| 9,483,744 B2 * | 11/2016 | Lord | ........... | G06Q 50/30 |
| 9,483,948 B1 * | 11/2016 | Gordon | ........... | G08G 1/166 |
| 9,488,484 B2 * | 11/2016 | Lord | ........... | G01C 21/34 |

(Continued)

FOREIGN PATENT DOCUMENTS

CN 1254967 C 5/2006
CN 101751630 A 6/2010

OTHER PUBLICATIONS http://wallstcheatsheet.com/stocks/can-gms-in-car-advertising-bring-in-big-bucks.html/. James Flaherty, "Can GM's In-Car Advertising Bring in Big Bucks?", May 9, 2013.

(Continued)

*Primary Examiner* — Jean-Paul Cass
(74) *Attorney, Agent, or Firm* — Maier & Maier, PLLC

(57) ABSTRACT

A vehicle with an integrated advertising system. The vehicle can include a computer, at least one receiver, and a driving control. At least one receiver may be configured to communicate wirelessly, for example with an antenna or satellite. The receiver may receive advertising or retail information pertaining to a good or service, also including housing, a menu, or entertainment opportunities. The advertising or retail information may be communicated to a user within the vehicle, and the user may indicate a desire to purchase the good or service. The user may instruct the computer to drive the vehicle to the location of the good or service autonomously or the user may instruct the computer to purchase the good or service, or both.

8 Claims, 4 Drawing Sheets

(56) References Cited

U.S. PATENT DOCUMENTS

| | | | | |
|---|---|---|---|---|
| 9,513,632 B1* | 12/2016 | Gordon | | G05D 1/0061 |
| 9,534,912 B2* | 1/2017 | Lord | | G01C 21/3423 |
| 9,552,559 B2* | 1/2017 | Lord | | G06Q 10/06 |
| 9,552,564 B1* | 1/2017 | Martenis | | G06Q 10/083 |
| 2001/0034625 A1* | 10/2001 | Kwoh | | G06Q 10/02 705/6 |
| 2002/0002488 A1* | 1/2002 | Muyres | | G06F 21/10 705/14.56 |
| 2002/0052751 A1* | 5/2002 | Ebata | | G06Q 10/08355 705/417 |
| 2002/0099599 A1* | 7/2002 | Minassian | | G06Q 10/08 705/13 |
| 2003/0040944 A1* | 2/2003 | Hileman | | G06Q 10/02 705/5 |
| 2003/0055689 A1* | 3/2003 | Block | | G06Q 10/02 705/5 |
| 2003/0220835 A1* | 11/2003 | Barnes, Jr. | | G06Q 10/1053 705/14.36 |
| 2003/0225600 A1* | 12/2003 | Slivka | | G06Q 10/047 705/5 |
| 2004/0139211 A1* | 7/2004 | Baker | | H04L 63/0457 709/230 |
| 2005/0033616 A1* | 2/2005 | Vavul | | G06Q 10/02 705/5 |
| 2006/0053053 A1* | 3/2006 | Baggett | | G06Q 10/02 705/14.33 |
| 2006/0053054 A1* | 3/2006 | Baggett | | G06Q 10/02 705/14.33 |
| 2006/0053055 A1* | 3/2006 | Baggett | | G06Q 10/02 705/14.33 |
| 2006/0122881 A1* | 6/2006 | Walker | | G06Q 10/087 705/14.13 |
| 2008/0134236 A1 | 6/2008 | Iijima et al. | | |
| 2008/0189143 A1* | 8/2008 | Wurster | | G06Q 10/02 705/5 |
| 2008/0189226 A1* | 8/2008 | Wurster | | G06Q 10/06 705/417 |
| 2008/0201227 A1* | 8/2008 | Bakewell | | G06Q 30/0217 705/14.19 |
| 2008/0281516 A1 | 11/2008 | Cummings | | |
| 2009/0063846 A1* | 3/2009 | Baker | | H04L 29/06 713/150 |
| 2009/0192851 A1* | 7/2009 | Bishop | | G06Q 10/08 705/26.3 |
| 2010/0042549 A1* | 2/2010 | Adamczyk | | G01C 21/00 705/80 |
| 2010/0049603 A1* | 2/2010 | Peterson | | G06Q 30/02 705/14.45 |
| 2011/0313880 A1* | 12/2011 | Paul | | G06Q 30/0631 705/26.7 |
| 2012/0158590 A1* | 6/2012 | Salonen | | G06Q 10/02 705/44 |
| 2012/0290150 A1* | 11/2012 | Doughty | | G08G 1/0116 701/2 |
| 2013/0297486 A1* | 11/2013 | Colborn | | G06Q 40/02 705/38 |
| 2014/0019365 A1* | 1/2014 | Fallows | | G06Q 20/202 705/71 |
| 2014/0136414 A1* | 5/2014 | Abhyanker | | G06Q 50/28 705/44 |
| 2014/0172727 A1* | 6/2014 | Abhyanker | | G06Q 30/0645 705/307 |
| 2014/0180914 A1* | 6/2014 | Abhyanker | | G01C 1/00 705/39 |
| 2014/0189013 A1* | 7/2014 | Abhyanker | | G06Q 10/087 709/204 |
| 2014/0200963 A1* | 7/2014 | Abhyanker | | G06Q 30/0205 705/7.34 |
| 2014/0266799 A1* | 9/2014 | Liu | | G06Q 30/0259 340/928 |
| 2015/0006005 A1* | 1/2015 | Yu | | G06Q 10/08 701/22 |
| 2015/0112585 A1* | 4/2015 | Knepper | | G06Q 30/0266 701/410 |
| 2015/0177010 A1* | 6/2015 | Abramson | | G01C 21/34 701/400 |
| 2015/0185034 A1* | 7/2015 | Abhyanker | | G01C 21/36 701/23 |
| 2015/0215738 A1* | 7/2015 | Frusina | | H04W 4/023 455/426.1 |
| 2015/0241231 A1* | 8/2015 | Abramson | | G01C 21/3697 701/534 |
| 2015/0348112 A1* | 12/2015 | Ramanujam | | G06Q 30/0266 705/14.63 |
| 2016/0027307 A1* | 1/2016 | Abhyanker | | G08G 1/005 701/117 |

OTHER PUBLICATIONS http://www.reddit.com/r/technology/comments/1nvewb/mercedes_driverless_research_car_looks_freaking/. "Mercedes' Driverless Research Car Looks Freaking Amazing," 2014.

http://mobilesound.blog.com/. Dhagz, "Microsoft to Boost In-Car Advertising," Feb. 28, 2008.

* cited by examiner

ADVERTISING-INTEGRATED CAR

BACKGROUND

The present invention relates to smart cars and, more particularly, to cars with an integrated advertising and shopping system. Though many cars today come equipped with systems to find gas stations, restaurants, and stores nearby, there is currently no system which allows for a general user to search for those locations and then simply tell their car to go there.

Currently, most search systems, even those integrated with cars, only allow searching for a location such as all Italian restaurants within a 5-mile radius. There is not however a vehicle equipped to handle a search request for a particular item, for example: "find all places which sell printers in a 5-mile radius." This type of search particularity, applied to goods, services, food, housing, and entertainment is greatly lacking in smart cars today.

Additionally, cars can be equipped with advertising. Besides advertisements displayed on billboards and street signs, generally the only way to reach potential consumers in a vehicle is through radio. This therefore represents a substantially untapped market. Today's self-driving car technology is potentially being under-utilized because of the lack of the ability of advertisers to reach occupants of cars and have those occupants instruct their cars to self-drive to the advertiser's location.

SUMMARY

A vehicle with an integrated advertising system may be disclosed. The vehicle can include a computer, at least one receiver, and a driving control. At least one receiver may be configured to communicate wirelessly, for example with an antenna or satellite. The receiver may receive advertising or retail information pertaining to a good or service, also including housing, a menu, or entertainment opportunities. The advertising or retail information may be communicated to a user within the vehicle, and the user may indicate a desire to purchase the good or service. The user may instruct the computer to drive the vehicle to the location of the good or service autonomously or the user may instruct the computer to purchase the good or service, or both.

BRIEF DESCRIPTION OF THE FIGURES

Advantages of embodiments of the present invention will be apparent from the following detailed description of the exemplary embodiments. The following detailed description should be considered in conjunction with the accompanying figures in which.

Exemplary

Exemplary

Exemplary

Exemplary

Exemplary

DETAILED DESCRIPTION

Figure 1A:
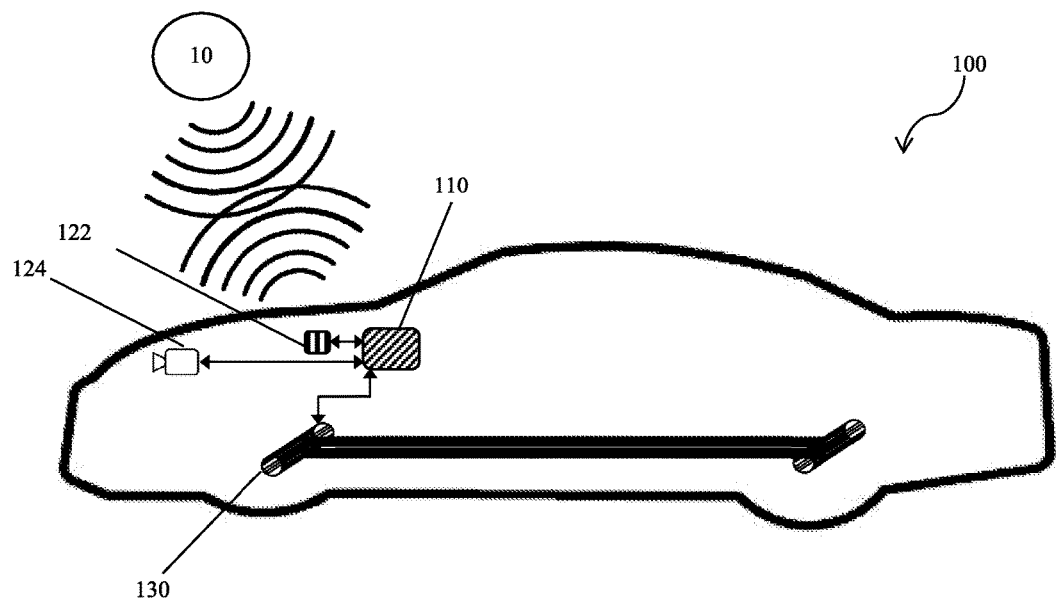
FIG. 1a shows an outline diagram of a vehicle with an integrated advertising system.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

According to at least one exemplary embodiment, a vehicle with an integrated advertising system may be disclosed. The vehicle can include a computer, at least one receiver, and a driving control. At least one receiver may be configured to communicate wirelessly, for example with an antenna or satellite. The receiver may receive advertising or retail information pertaining to a good or service, also including housing, a menu, or entertainment opportunities. The advertising or retail information may be communicated to a user within the vehicle, and the user may indicate a desire to purchase the good or service. The user may instruct the computer to drive the vehicle to the location of the good or service autonomously or the user may instruct the computer to purchase the good or service, or both.

Referring to exemplary FIG. 1a, a vehicle 100 with an integrated advertising system may include a computer 110, a wireless receiver 122, a visual receiver 124 and a driving control 130. Computer 110 may be integrated into vehicle 100 and may include a user interface accessible to occupants of vehicle 100, for example, a display, or as desired. Computer 110 may be configured to receive user input in any fashion known in the art. For example, computer 110 may receive input via buttons, a touchscreen, voice commands, or as desired. Wireless Receiver 122 may be functionally coupled to computer 110 and may be configured to receive wireless signals from an external server 10. External server 10 may be for example a server which provides geolocation information, a streaming audio signal, or other content, as desired. External server 10 may also provide advertising content which may be received by wireless receiver 122, relayed to computer 110, and communicated to the occupants of vehicle 100. For example, the advertising content may be displayed visually on a display in the vehicle. The advertising content may relate to goods for sale, services for sale, food for sale, available tickets for an entertainment venue, or as desired. Advertising content may also include non-direct advertising, for example recommendations by reviewers or friends of the user, received through a review website, a social network, or other server, as desired. For, example, in embodiments described herein, "advertising content," "advertisement," and related words refer to substantially the same type of content throughout this application. Visual receiver 124 may be functionally coupled to computer 110 and may be configured to receive visual inputs, for example visual advertisements on billboards, in storefronts, on road signs, or as desired. Visual receiver 124 may convert advertising, sale, or other retail information into text for transmission to computer 110. Computer 110 may then communicate advertising content to the occupants of vehicle 100 as described above.

Upon viewing advertising content, an occupant of vehicle 100 may choose to give an input to computer 110 indicating a desire to purchase the advertised content. Computer 110 may then utilize geolocation location received from wireless receiver 122 via external server 10. If desired, computer 110 may then provide directions to the physical location of the advertised content. Alternatively, if desired, computer 110 may interface with driving control 130. Driving control 130 may operate the driving functions of vehicle 100 autonomously, without the need of a human driver. Computer 110 may direct driving control 130 to drive vehicle 100 to the physical location of the advertised content.

Figure 1B:
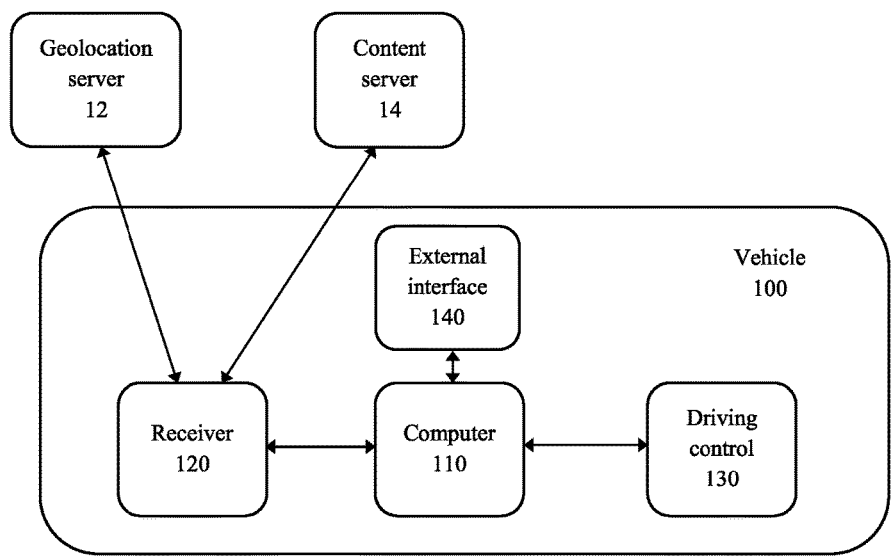
FIG. 1b shows an schematic diagram of a vehicle with an integrated advertising system.

Exemplary FIG. 1b shows a diagrammatic view of a vehicle 100 with an integrated advertising system. Receiver 120 may be a wireless receiver or visual receiver as shown in exemplary FIG. 1a and described above. One or more receivers 120 may be utilized, but for clarity only one is shown. Receiver 120 may interface with one or more external servers, for example a geolocation server 12 and a content server 14. Though more servers are contemplated by this invention, for clarity only two are shown in this non-limiting embodiment. Geolocation server 12 may provide geolocation information, for example based on triangulation of a cellular signal or based on a GPS signal, or as desired. Content server 14 may communicate with receiver 120 through a satellite or a ground-based antenna. Further, content server 14 may be general broadcaster or a private broadcaster. For example, a private broadcaster may be a "brick-and-mortar" business which primarily advertises its own goods or services via a broadcast antenna to any receiving units within the broadcast range. It is contemplated that receiver 120 may be constructed as to interface with one or more servers contemporaneously. Additionally, multiple receivers 120 may be utilized to manage external communications between vehicle 100 and any external servers, broadcasters, or visual inputs, if desired.

Occupants of vehicle 100 may interface with computer 110 directly, for example as described above, or through an external interface 140. External interface 140 may be a mobile computing device which may communicate in a wired or wireless fashion with computer 110. Non-limiting examples of a mobile computing device may include a remote control, a tablet computer, or a phone. Computer 110 may be configured to store users' preferences or advertisement/retail history for later recall. Additionally, computer 110 may be configured to transfer information to external interface 140. Transferred information may include the address of a chosen advertisement, user preferences, user purchase history, or as desired.

Figure 2:
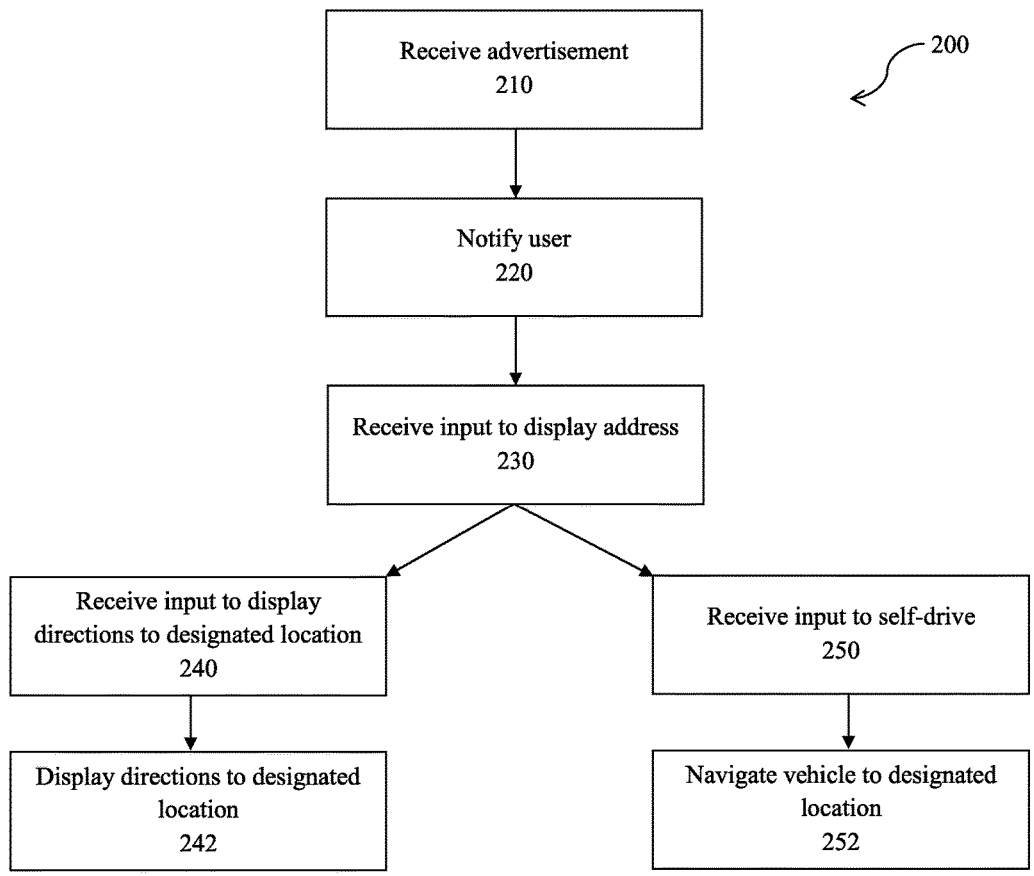
FIG. 2 shows a flow chart for a method of integrating advertising into a vehicle.

Now referring to exemplary FIG. 2, a method 200 for integrating advertising into a vehicle may begin with receiving an advertisement or advertising content in step 210. The receiving of an advertisement may be accomplished substantially through the means described above. The advertisement may be received by a receiver integrated into a vehicle and processed by an on-board computer. The advertisement may relate to goods for sale, services for sale, food for sale, housing for sale or rent, available tickets for an entertainment venue, or as desired. Next, in step 220 a user may be notified of the advertisement. The notification of the advertisement may be accomplished via audio or visual means, or a combination of both, as desired. For example, an audio advertisement may be played by speakers located in the vehicle whereas a visual advertisement may be displayed on a screen. The advertisement may be for a particular good or service which is being offered for sale within a given distance from the vehicle. Optionally, in notifying the user of the advertisement, the distance to the physical location of the good or service for sale may be communicated to the user as well. Alternatively, in a next step 230, an input may be received from a user to display the address of the good or service being offered for sale, after which the address may be displayed to the user.

Either of two inputs may then be received. In the first case, an input may be received directing the vehicle's on-board computer to display directions to the location of good or service (240). In this first case, the computer may then utilize geolocation information and display directions for the driver of the vehicle to drive to the location (242). In the second case, an input may be received directing the vehicle's on-board computer to engage the driving controls of the vehicle and autonomously drive the vehicle to the location (250). In this second case, the following step 252 may involve autonomously navigating the vehicle to the desired location. According to one embodiment, step 250 may be achieved in a two sub-step process. The first sub-step may include providing a first input, for example a voice command or a touch-based input. The computer may then ask for verification of the command, and in a second sub-step a second input may be provided to verify the user's wish to have the vehicle self-drive to the location. The second input may be the same type or a different type of input from the first. Either or both of the first or second inputs may also serve to verify the user's identity, for example utilizing finger print or eye retina scanning or other identification technology.

Method 200 may be performed via a vehicle similar to that as described above and shown in exemplary FIGS. 1a and 1b. Additionally, method 200 may be integrated with a driving distance limitation (not shown). The driving distance limitation may be integrated through the driving control of a vehicle, for example as shown in exemplary FIG. 1a. The driving distance limitation may, for example, allow parents to set a maximum driving distance from the home while their dependent(s) go shopping.

Figure 3:
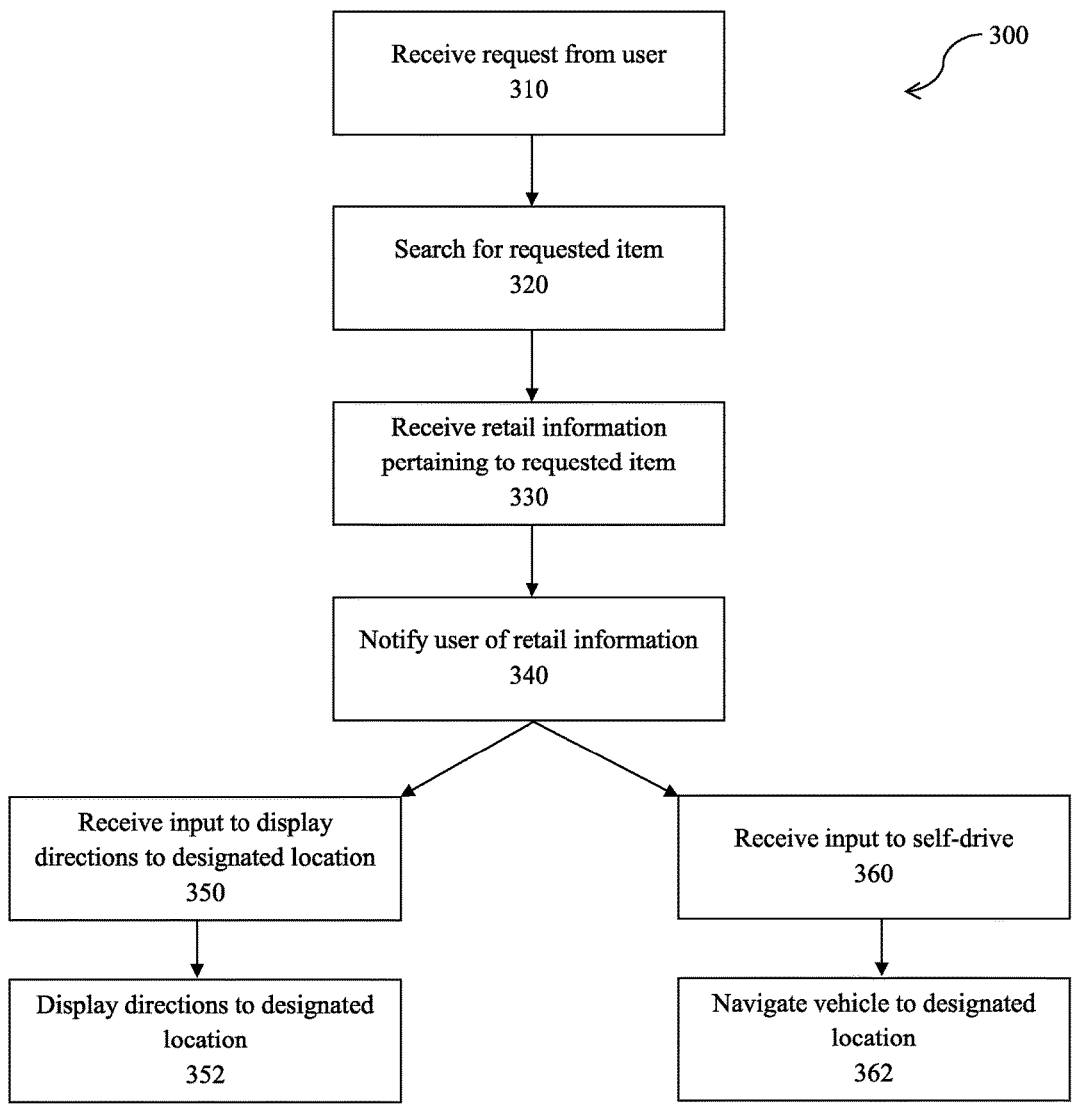
FIG. 3 shows a flow chart for integrating product or service searching into a vehicle.

Now referring to exemplary FIG. 3, a method 300 for integrating product or service searching into a vehicle may begin with receiving a search request from a user in step 310. The search request may be a request for a particular good, service, type of business, entertainment offering, housing for sale or rent, culinary offering, or as desired. In step 320, the computer receiving the request may interface with one or more external servers through an on-board receiver to search for the object of the search request. In searching, the computer may search for matches within a particular geographic area. The geographic area may be for example, anything within a particular radius of the vehicle, an area as defined by the user, or as desired. In one non-limiting example, a user may search for a DVD of Movie A, and the computer may search for all stores within a given radius of the vehicle which offer a DVD of Movie A for sale. The receiver may interface with one or more remote general-purpose servers, for example through the internet, or with one or more local servers, for example local short-range broadcasters set up by local businesses, or with a combination of general-purpose and local servers, or as desired. In step 330, the computer, through the receiver, may receive retail information pertaining to the request. Pertinent retail information may include, for example, the exact good or service being sold, the business selling the good or service, the physical location (address) of the business, or as desired. In step 340, some or all of the retail information may be communicated to a user. Communication of the retail information may be through audio or visual means, or a combination of both, as desired.

In step 350, a user may then provide an input directing the computer to display directions to the requested location. The computer may then utilize geolocation information and display directions for the driver of the vehicle to drive to the location (352).

In step 360, an input may be received directing the vehicle's on-board computer to engage the driving controls of the vehicle and autonomously drive the vehicle to the location. The following step 362 may involve autonomously navigating the vehicle to the desired location. According to one embodiment, step 360 may be achieved in a two sub-step process. The first sub-step may include providing a first input, for example a voice command or a touch-based input. The computer may then ask for verification of the command, and in a second sub-step a second input may be provided to verify the user's wish to have the vehicle self-drive to the location. The second input may be the same type or a different type of input from the first. Either or both of the first or second inputs may also serve to verify the user's identity, for example utilizing finger print or eye retina scanning or other identification technology.

Method 300 may be performed via a vehicle similar to that as described above and shown in exemplary FIGS. 1*a* and 1*b*. Additionally, method 300 may be integrated with a driving distance limitation (not shown). The driving distance limitation may be integrated through the driving control of a vehicle, for example as shown in exemplary FIG. 1*a*. The driving distance limitation may, for example, allow parents to set a maximum driving distance from the home while their dependent(s) go shopping.

Figure 4:
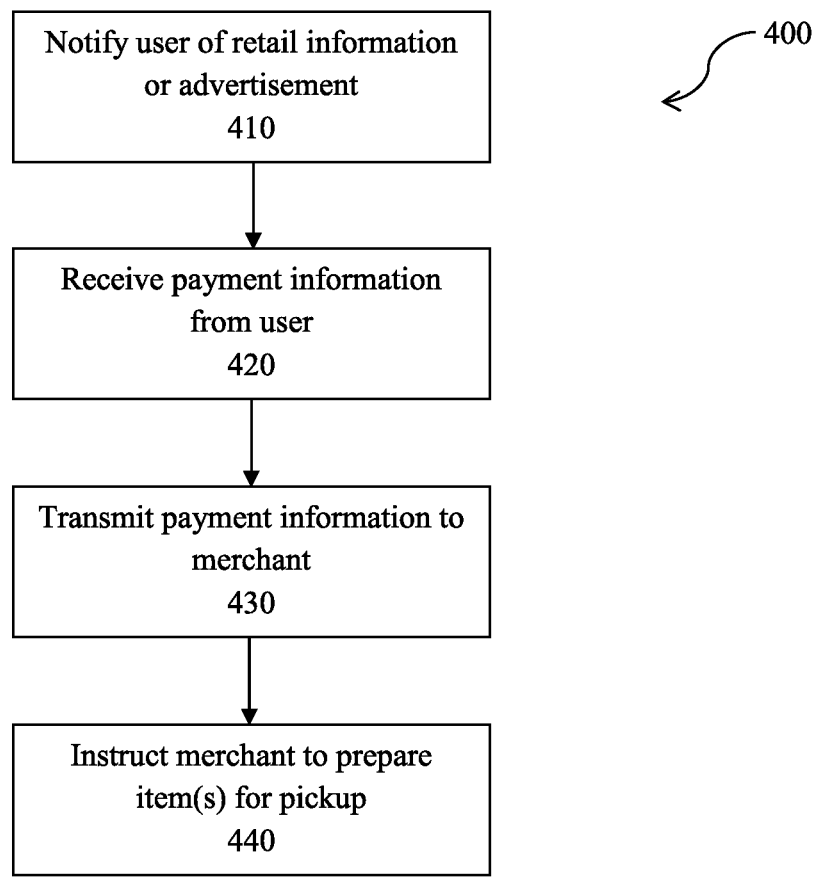
FIG. 4 shows a flow chart for integrating product or service purchasing into a vehicle.

Now referring to exemplary FIG. 4 a method 400 for integrating product or service purchasing into a vehicle may begin with notifying a user of retail information or an advertisement in step 410. This notification may similar to that as described above and shown in exemplary FIGS. 2 and 3, specifically step 220 of method 200 or step 340 of method 300. The information displayed in the vehicle may therefore be received passively in the form of an advertisement or actively as the result of a user's search request. In step 420, payment information may be received from a user. Payment information may include credit card information, a bank account number, or any other electronic funding format, or as desired. According to at least one non-limiting embodiment, payment information may only include a user's name. Payment information may be inputted each time by a user or may be saved on the computer for re-use. According to one non-limiting embodiment, a user may set a maximum payment amount such that attempts to pay for goods or services which exceed the maximum payment amount either in an individual capacity or in a net sum may be denied. In step 430, the payment information is transmitted to the chosen merchant relating to the retail information or advertisement as communicated to the user in step 410. In step 440, instructions are communicated to the merchant to prepare the paid-for items for pickup, or to ready the selected services for the user's arrival. Alternatively, in step 440, instructions may be communicated to the merchant to ship any paid-for items to a specific location, for example to the user's home, or as desired.

According to one non-limiting embodiment, method 400 may allow a user to pre-select and pre-pay for food through a computer integrated in a vehicle, allowing the user to simply pick up the food at the counter or drive-through window. According to another non-limiting embodiment, method 400 may provide for tickets to be purchased and held at will-call at a theater. According to another non-limiting embodiment, seats at a restaurant may be reserved using method 400.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A vehicle, driving, and navigation system, comprising: a computer integrally installed in said vehicle; at least one wireless receiver; and a driving control, said driving control configured to control the driving capabilities of the vehicle;

wherein the at least one wireless receiver is configured to receive retail information and transmit the retail information to the computer, the computer is configured to communicate said retail information to a user within the vehicle through a user interface provided on a screen integrally installed in the vehicle, the computer is configured to receive an input from the user through the user interface indicating a request to drive to a location, said location identified as related to said retail information, and the computer is configured to interface with the driving control such that the driving control can autonomously drive the vehicle to the location wherein the computer is configured to receive an input indicating a desire to purchase the subject of the retail information, and the input indicating a desire to purchase the subject of the retail information is an input directing the computer to direct the driving control to drive the vehicle to the location of the subject of the retail information, and an input directing the computer to purchase the subject of the retail information:

wherein the computer is configured to receive a maximum payment amount, said maximum payment amount defining a maximum monetary amount, and wherein the computer may reject an input indicating a desire to purchase the subject of the retail information if the cost of the subject of the retail information summed with the costs of prior subjects of the retail information purchased exceeds the maximum payment amount.

2. The vehicle, driving, and navigation system of claim 1, further comprising at least one visual receiver, wherein the at least one visual receiver is configured to receive retail information and transmit the retail information to the computer.

3. The vehicle, driving, and navigation system of claim 1 wherein the input from the user indicating a request to drive to a location further comprises:
   a user indication to drive to the location; and
   a user verification of the request to drive to the location.

4. The vehicle, driving, and navigation system of claim 1 wherein at least one of the user indication to drive to the location and the user verification of the request to drive to the location further comprises a verification of the user's identity.

5. The vehicle, driving, and navigation system of claim 1, wherein the computer is configured to communicate with an external interface.

6. The vehicle driving, and navigation system of claim 5, wherein the external interface is a mobile computing device.

7. The vehicle, driving, and navigation system of claim 1, wherein the at least one wireless receiver is configured to receive geolocation information.

8. The vehicle, driving, and navigation system of claim 1, wherein the driving control is configured to accept a distance limitation, wherein said distance limitation defines a geographic area, and wherein the driving control causes the vehicle to remain inside the defined geographic area.

* * * * *